March 8, 1960    L. PÉRAS    2,927,653
COMMERCIAL VEHICLE
Filed June 21, 1955

INVENTOR.
LUCIEN PÉRAS
BY
ATTORNEY

United States Patent Office 2,927,653
Patented Mar. 8, 1960

2,927,653

COMMERCIAL VEHICLE

Lucien Péras, Billancourt, France, assignor to Regie Nationale des Usines Renault, Billancourt, France Application June 21, 1955, Serial No. 517,035

Claims priority, application France August 11, 1954

2 Claims. (Cl. 180—42)

The invention relates to commercial motor vehicles, and is concerned more particularly with the judicious arrangements of the members on the chassis, permitting the lowering, in particular, of the floorboard carrying the merchandise, and thus facilitating handling.

The problems of loading and unloading aboard relatively light commercial vehicles, for retail delivery of goods, have resulted in the lowering of the floor boards of the vehicles to such an extent that it is difficult, in these circumstances, to keep at the back the transmission and drive which causes upsweeping of the floor-board.

The various solutions proposed for front-wheel drive present difficulties regarding road-holding when empty, the dead weight being badly distributed and generally straddling the front axle. In these circumstances, the back wheels do not cling to the ground, and this is the cause of skidding, wobble, excessive wear of the tires, and accidents.

The arrangement, forming the subject of the invention, avoids the majority of these disadvantages and has as its object, while retaining the principle of front-wheel drive, the shifting back between the two axles of the load consisting chiefly of the engine, thus leaving above the front axle only a small portion of the loads resulting from the presence of the driver, of his helper, and possibly of a third passenger, these loads being situated to the rear of the axle.

The invention consists essentially in mounting the engine in a chassis with front-wheel drive, laterally behind one of the front seats in such a position that the axis of said engine is oblique in relation to that of the Cardan shafts for transmission to the front wheels, said arrangement being supplemented, in order to obtain a suitable equilibrium of the loads when empty, by mounting the spare wheel and the accumulator battery on the opposite side of the chassis to that carrying the engine.

Figure 1:
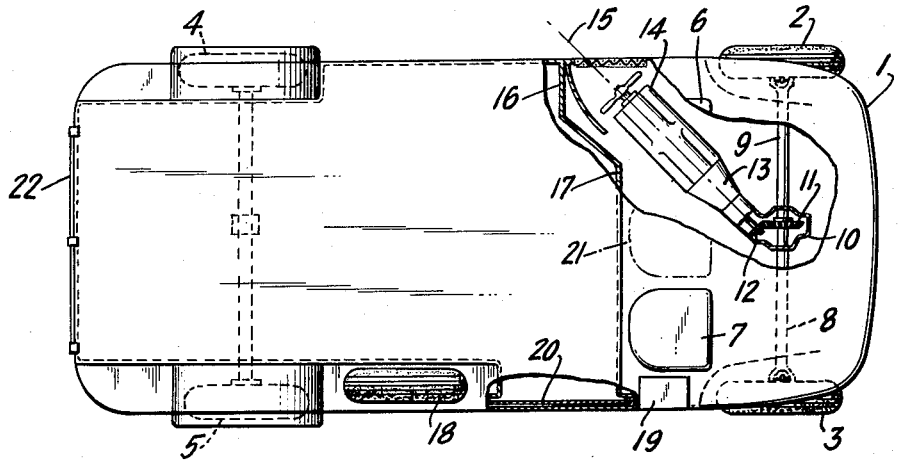
Figure 2:
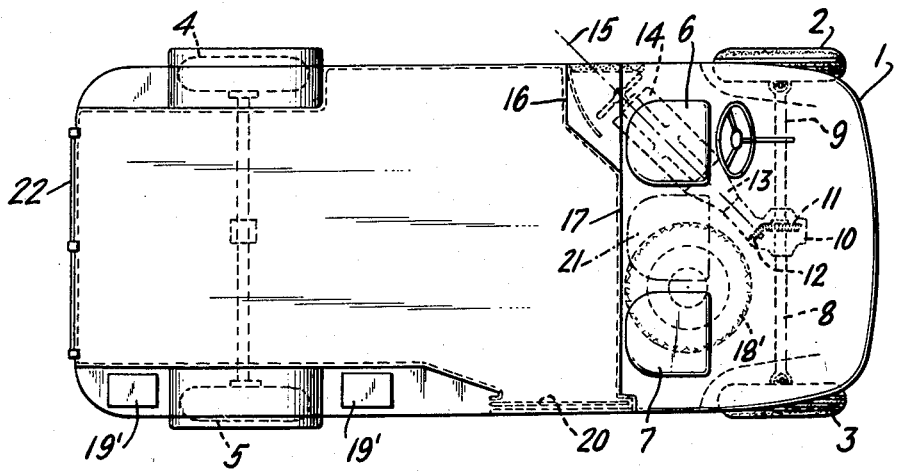

The annexed drawing illustrates diagrammatically the chassis of a commercial vehicle having the arrangements of members according to the invention, Figure 1 being a plan view of a chassis, and Figure 2 is a plan view of a different embodiment of such a chassis.

Referring to the drawing, it will be seen that the body 1, forming the body of the vehicle for example, equipped with its four wheels 2, 3, 4 and 5, has, inside, the seats for the driver and his helper 6 and 7, thus providing forward control with perfect visibility. Moreover, the position of the drive above the front wheels facilitates steering.

The front-wheel drive is effected by means of universal joints associated with half-shafts such as 8 and 9 starting from a differential 10 in which the bevel crown wheel 11 is engaged by a bevel pinion 12. This pinion 12 is mounted at the output end of a gearbox 13 which is integral, in the usual manner, with the engine 14. It will be seen that the angle of the axis of the engine 14 and of the shafts 8 and 9 is comprised between 30° and 75° so that it is possible to start the engine with the starting handle, the driver standing at 15, at the end of the crankshaft.

The engine is isolated inside the body by a wall 16, and a partition 17 may separate the seats from the space reserved for loading. This arrangement permits the addition of a third seat 21 in the middle for an additional passenger.

At the same time, in order to balance the weight of the engine, situated on the left, the spare wheel is placed on the right at 18 (Figure 1) or under the passenger seats at 18' (Figure 2), and the accumulators at 19 (Figure 1) or 19' (Figure 2), but any other arrangement for the distribution of the accumulators and the spare wheel would be valid and included in the invention provided that their weight balanced that of the engine.

A further advantage of this arrangement is to reserve space, according to usual practice, for a sliding door 20 on the right hand side of the vehicle, through which the latter may be loaded and unloaded. Needless to say, the rear opening 22, provided with a sliding, pivoting or folding door, may also serve these purposes.

The same arrangements remain valid in the case of a vehicle intended for countries where driving is on the left instead of on the right of the load. The position of the engine and of the spare wheel is then reversed, that is to say the engine on the right and the spare wheel on the left, with a door on the left, on the near side. In this case, it is preferable to have the driving seat on the right, that is to say at 7, and the helper's seat at 6. Altogether, the arrangement is exactly symmetrical with that illustrated in the drawing.

The method of transmission through a gear-box and bevel couple to the differential gear, associated with the driven front wheels and the Cardan shafts 8 and 9, is not of a type rendered absolutely necessary by the subject of the invention. It is conceivable for these transmissions to be effected by different means such as: hydraulic transmission, magnetic clutches, automatic change-speed gears, etc.

I claim:

1. A commercial vehicle having a front-wheel drive and a body providing a rear cargo space having a longitudinal dimension which is a major portion of the longitudinal dimension of the vehicle, a plurality of symmetrically disposed seats forwardly of the cargo space, driving axles supporting wheels forwardly of said seats, an engine disposed at least partly below one of said seats, said engine lying on an axis which is oblique with respect to the axis of said driving axles and on one side of the longitudinal axis of said body, and means for transmitting the engine torque to the driving axles, the rear portion of said engine being disposed in proximity to one side of said body, and the battery and spare tire being carried by said body on the side of the longitudinal axis of the vehicle opposite that in which said engine is disposed.

2. A commercial vehicle having a front-wheel drive and a body providing a rear cargo space having a longitudinal dimension which is a major portion of the longitudinal dimension of the vehicle, a plurality of symmetrically disposed seats forwardly of the cargo space, driving axles supporting wheels forwardly of said seats, an engine disposed at least partly below one of said seats, said engine lying on an axis which is oblique by an angle of 30° to 75° with respect to the axis of said driving axles and on one side of the longitudinal axis of said body, and means for transmitting the engine torque to the driving axles, the rear portion of said engine being disposed in proximity to one side of said body, and the battery and spare tire being carried by said body on the side of the longitudinal axis of the vehicle opposite that in which said engine is disposed.

References Cited in the file of this patent

UNITED STATES PATENTS

| | | |
|---|---|---|
| 980,603 | Clarke | Jan. 2, 1911 |
| 1,078,602 | Morgan | Nov. 11, 1913 |
| 1,473,194 | Mayer | Nov. 6, 1923 |
| 2,070,758 | Spatz | Feb. 16, 1937 |
| 2,096,541 | Haltenberger | Oct. 19, 1937 |
| 2,165,452 | Carlson | July 11, 1939 |
| 2,362,453 | Cosper | Nov. 14, 1944 |
| 2,480,047 | Reinhard | Aug. 23, 1949 |
| 2,531,268 | Herrington | Nov. 21, 1950 |
| 2,700,428 | Nallinger | Jan. 5, 1955 |
| 2,720,931 | Thannhauser | Oct. 18, 1955 |

FOREIGN PATENTS

| | | |
|---|---|---|
| 74,435 | Austria | July 10, 1918 |
| 420,510 | Great Britain | Aug. 30, 1933 |